United States Patent
Pick et al.

(10) Patent No.: US 9,284,949 B2
(45) Date of Patent: Mar. 15, 2016

(54) BEARING ARRANGEMENT OF A WIND TURBINE AND METHOD FOR ADJUSTING THE PRELOAD OF A BEARING ARRANGEMENT

(71) Applicant: Eolotec GmbH, Nuremberg (DE)

(72) Inventors: Mathias Pick, Nuremberg (DE); Wolfgang Losert, Nuremberg (DE)

(73) Assignee: Eolotec GmbH, Nuremberg (DE)

( * ) Notice: Subject to any disclaimer, the term of this patent is extended or adjusted under 35 U.S.C. 154(b) by 0 days.

(21) Appl. No.: 14/513,531

(22) Filed: Oct. 14, 2014

(65) Prior Publication Data

US 2015/0030277 A1    Jan. 29, 2015

Related U.S. Application Data

(63) Continuation of application No. PCT/EP2013/001053, filed on Apr. 10, 2013.

(30) Foreign Application Priority Data

Apr. 13, 2012   (DE) .................. 10 2012 206 113

(51) Int. Cl.
| | |
|---|---|
| F16C 41/02 | (2006.01) |
| F03D 11/00 | (2006.01) |
| F16C 25/06 | (2006.01) |
| F16C 19/38 | (2006.01) |
| F16C 19/54 | (2006.01) |
| F16C 37/00 | (2006.01) |
| F16C 19/36 | (2006.01) |

(52) U.S. Cl.
CPC ............ *F03D 11/0008* (2013.01); *F16C 19/38* (2013.01); *F16C 19/548* (2013.01); *F16C 25/06* (2013.01); *F16C 41/02* (2013.01); *F05B 2240/50* (2013.01); *F16C 19/364* (2013.01); *F16C 37/007* (2013.01); *F16C 2229/00* (2013.01); *F16C 2240/14* (2013.01); *F16C 2300/14* (2013.01); *F16C 2360/31* (2013.01); *Y02E 10/722* (2013.01)

(58) Field of Classification Search
CPC ... F16C 2229/00; F16C 37/007; F16C 25/083
See application file for complete search history.

(56) References Cited

U.S. PATENT DOCUMENTS 2,762,112 A *   9/1956   Kylen ........................ 29/898.07
4,012,154 A     3/1977   Durwin et al.

(Continued)

FOREIGN PATENT DOCUMENTS

| DE | 24 24 262 | 4/1975 |
|---|---|---|
| DE | 10 2007 001 918 A1 | 7/2008 |
| DE | 10 2007 051 237 A1 | 4/2009 |
| DE | 10 2009 054 498 A1 | 5/2011 |
| EP | 2290250 A2 * | 3/2011 |

*Primary Examiner* — Thomas R. Hannon
(74) *Attorney, Agent, or Firm* — Muncy, Geissler, Olds & Lowe, P.C.

(57) ABSTRACT

To facilitate adjusting a bearing arrangement, particularly in a wind turbine, for different operating situations, the bearing arrangement has an adjusting device with which the bearing preload can be adjusted starting from a base preload. This can allow, for example signs of wear to be compensated, manufacturing tolerances or design inaccuracies to be corrected and in particular current loading states to be addressed. This design avoids the otherwise usual overdimensioning of the bearing arrangement, thereby increasing the efficiency of the wind turbine as well as the service life of the bearing arrangement.

19 Claims, 6 Drawing Sheets

(56) References Cited

U.S. PATENT DOCUMENTS

| | | | |
|---|---|---|---|
| 4,336,641 A | 6/1982 | Bhatia | |
| 4,828,292 A * | 5/1989 | Jansen | 384/626 |
| 5,046,870 A * | 9/1991 | Ordo | 384/563 |
| 5,947,613 A * | 9/1999 | Cormier | 384/538 |
| 7,562,519 B1 * | 7/2009 | Harris et al. | 384/900 |
| 2007/0177829 A1 | 8/2007 | Rode | |
| 2009/0245969 A1 | 10/2009 | White et al. | |
| 2010/0026005 A1 * | 2/2010 | Nitzpon et al. | 384/583 |
| 2010/0299926 A1 | 12/2010 | Stitzinger | |

\* cited by examiner

BEARING ARRANGEMENT OF A WIND TURBINE AND METHOD FOR ADJUSTING THE PRELOAD OF A BEARING ARRANGEMENT

This nonprovisional application is a continuation of International Application No. PCT/EP2013/001053, which was filed on Apr. 10, 2013, and which claims priority to German Patent Application No. 10 2012 206 113.4, which was filed in Germany on Apr. 13, 2012, and which are both herein incorporated by reference.

BACKGROUND OF THE INVENTION

1. Field of the Invention

The invention relates to a wind turbine bearing arrangement that is designed as a main bearing for a rotor of the wind turbine, as well as a method for adjusting a preload of a bearing arrangement of the type specified.

2. Description of the Background Art

Wind turbines generally feature a turbine, at the front end of which is arranged a rotatable gondola which constitutes a machine carrier. On the gondola, a rotor hub is mounted rotatably around a rotational axis, with rotor blades being secured to the hub. Wind turbines can either employ a direct drive concept, according to which the rotational motion of the rotor hub is directly and immediately transmitted to a rotor of a generator, or have gearing interposed between the rotor hub and the generator.

One of the technical challenges with wind turbines of this type, which are typically designed for electrical output ranging in the several MW, is providing a bearing that can satisfy the high technological demands, such as high flexural stiffness, play-free bearing, low-wear kinematics as well as being as simple as possible to assembly while offering high efficiency at the same time. When operating, modern wind turbines are subjected to a host of load fluctuations and environmental influences which considerably impact the strain on and function of all components. These fluctuations can lead to component overload and damage and thereby high consequential expenses. To prevent this, individual components are normally overdimensioned to safeguard against all possible fluctuations in load. This problem is likewise seen in what is referred to as the main bearing of the wind turbine, which constitutes the linking member between the rotating system and the stationary system. All load fluctuations which result from the site of the installation, from malfunctions in pitch or azimuth systems or from control fluctuations of electrical network, generator and converter, must be absorbed by this main bearing. This results in a conservative and thus a not especially dimensioning of the main bearing. In addition to these economic aspects, this type of overdimensioning results in an increased frictional torque compared to that of a normal design, which in turn results in shorter service lives, increased breakaway torque at low wind velocities and increased strain on materials and construction elements.

SUMMARY OF THE INVENTION

It is therefore an object of the present invention to provide an improved bearing arrangement for the bearing of a wind turbine rotor.

A bearing arrangement is described in applicant's international application PCT/EP2013/000245 (WO 2013/113487 A1), which is incorporated herein by reference. This bearing arrangement features a stator unit as well as a rotor unit which are arranged between two bearings spaced at a distance from one another, wherein a closed preload circuit is formed over the two bearings as well as the two units, via which a base preload is adjusted during the installation of the bearing unit. This base preload corresponds to a design preload for which the bearing arrangement is generally designed with regard to the operating situation to be expected. In the case of conventional bearing arrangements, this is adjusted usually through a design layout of the individual components, such as manufacturing dimensions, clearances, etc.

On the other hand, an adjusting device is realized according to an embodiment of the invention which has a clamping ring, via which the preload can be adjusted relative to the base preload. For this purpose, the clamping ring acts on one of the bearing rings of the bearing, hereinafter referred to as bearing clamping ring, such that the bearing preload is adjusted overall via said bearing clamping ring. Owing to the special design with the preload circuit, the preload acting only on the one bearing clamping ring is thus transmitted to both bearing via the preload circuit, such that an especially efficient adjustment and variation of total bearing preload is facilitated.

The adjusting device facilitates a systematic adjustment as well as adapting the main bearing of a wind turbine to the different structural demands and load changes or strain situations. Proceeding from the base preload, the bearing preload can thus be reset such that the bearing preload can be adjusted overall for the prevailing operating conditions. As a result, the bearing arrangement no longer needs to be excessively overdimensioned overall, thus allowing it to be designed more cost effectively and thus more economically overall. An optimized bearing preload additionally has a positive impact on both total service life and frictional forces. A particular advantage of adjustability is that the entire bearing arrangement is thus in a certain way error-tolerant with regard to the construction imprecisions or also tolerance precisions. The bearing arrangement is thus expediently identical for all installations of an identical installation type or of a same output class, for example with an output variability of only 300 kW, at all locations and is not adjusted according to prevailing loads (wind loads at location) and/or equipment configurations until final assembly. This radically simplifies both the planning and manufacturing of installations of this type. It is thus not necessary to develop and separately manufacture different main bearings.

The adjustability also makes it possible to correct occurrences of wear that lead to losses in preload, for example.

The clamping ring of the adjusting device can include two ring parts, for example, a retaining ring part and a clamping ring part, the latter having a projecting collar. The retaining ring part is braced against the stator or rotor unit by means of fastening elements, in particular bolts. The clamping ring part is connected to the bearing with the bearing clamping ring to transfer a preload. The transfer can occur directly through a direct system as well as indirectly via a clamping or adjustment element. The relative position of the bearing clamping ring in relation to the bearing units, i.e. the stator unit and the rotor unit, can be adjusted within an adjustment distance, preferably in longitudinal direction and/or radially. The longitudinal adjustment distance measures in the area of several tenths of a millimeter. With conventional construction, the construction of the retaining ring part at the attached stator or rotor unit usually defines the conventional base preload.

According to an embodiment, a distance element can be arranged between the clamping ring and the bearing clamping ring for varying the bearing preload, the distance element being interchangeably arranged when the bearing units are in assembled state and preload being adjustable through the thickness of the distance element. For adjusting preload, distance elements of various thicknesses are thus simply reserved and installed as needed. In this respect, it is especially important that the distance elements are interchangeably arranged when the bearings are installed. The term "installed bearings" can mean that the clamping ring remains in its installed position, at the most only slightly loosened, so that there is no danger of the bearing elements slipping out.

Distance elements can be, for example, spacer sheets, sheeting foil or other interchangeable intermediate pieces. The distance element is also expediently realized as a distance ring, the distance ring preferably being divided into individual segments, specifically in such a manner that they can be removed in radial direction. The segmentation of the circumferential distance ring and the realization of individual separate ring segments thus facilitate especially simple replacement. It also simplifies the installation and removal of the distance ring, which expediently involves a distance element being replaced by another in each segment. In this way, the remaining areas of the bearing continue to remain in place. For removing or installing the replacement segments, preferably only the preload is reduced somewhat to allow the individual segments to be removed.

In an embodiment, the segments feature open recesses on one side through which the fastening elements, such as for example the fastening bolts for securing the clamping ring, are guided through or can be guided through. The opening is thus oriented such that the segments can be removed in radial direction when the fastening elements are installed.

In an embodiment, the distance element can be arranged between the bearing clamping ring and the clamping ring. The retaining ring part thus remains in a defined position at all times, particularly on the front end of one of the particular bearing elements. The advantage of this is that the fastening bolts for securing the clamping ring to the bearing unit do not have to be loosened when replacing the distance elements as would be required if the distance elements were arranged between the retaining ring part and bearing unit as is alternatively envisioned. If, on the other hand, the distance elements are arranged between the clamping ring part and the bearing clamping ring, then it is necessary to only press somewhat away from the clamping ring part.

To make this possible, an exemplary embodiment has threaded holes in the clamping ring part for ejector bolts. For installation/removal, ejector bolts are thus screwed into these threaded holes, longitudinally displacing the bearing clamping ring such that the tension on the distance element is reduced, thus allowing the removal thereof. The open recesses allow these elements to be removed radially in spite of the ejector bolts.

In an alternative embodiment, the threaded holes serve to accommodate clamping screws via which the preload is exerted and maintained in normal operation. These clamping screws thus adjust the axial position of the bearing clamping ring and thus the preload. To change bearing preload it is therefore necessary to only tighten or slightly loosen the clamping screws accordingly.

It is expedient if arranged generally on the clamping ring part are clamping elements, for example, such as the aforementioned clamping screws, via which the preload is transferred to the bearing clamping ring in normal operation. The clamping ring part constitutes insofar a counter bearing for these clamping elements, which are thus effective between the clamping ring, in particular the clamping ring part and the bearing clamping ring, and displace the parts axially and/or radially. In addition to the already mentioned clamping screws, embodiments employ hydraulic elements, adjustable spring elements, electrically controllable elements, piezo elements or also clamping wedges. With regard to hydraulic elements, a first example has a plurality of hydraulic elements arranged around the circumference of the clamping ring, the hydraulic elements being placed in corresponding holes on the clamping ring part, for example. The hydraulic cylinders in this case are completely self-contained hydraulic units. Alternatively, the respective hydraulic element is realized within the clamping ring part itself, i.e. a hydraulic piston is installed in a sealed manner in recesses, in particular drill holes, on the clamping ring part. Arranged at the base of the recess designed, for example, as a blind hole is a hydraulic fluid, which is connected to a corresponding hydraulic system and by means of which the hydraulic piston can be displaced. Spring elements can be passive springs, for example, spring sets, helical springs, etc. These are can be placed in recesses on the clamping ring part. The preload of the spring elements can additionally be adjusted to generate various bearing preloads. This is facilitated via the clamping screws which are screwed into the recesses realized as threaded holes and act on the particular spring element, thereby compressing it.

In an embodiment with the piezo elements, piezo stacks can be used which bring about an electrically controlled stroke movement which is transferred to the bearing clamping ring particularly in longitudinal direction. The stroke length is can be implemented by a lever action to achieve a sufficient adjustment stroke.

If the clamping elements are realized as clamping wedges, multiple clamping wedges of this type can be driven between clamping ring part and bearing clamping ring. In principle, a completely closed taper ring can also be used. The at least one clamping wedge can be used with the aid of another clamping element, for example a clamping screw. In an embodiment with the clamping wedge substantially simultaneously brings about a change in the axial as well as radial preload.

According to an embodiment for adjusting preload which, can also be used in combination with the previously described adjusting mechanisms, the adjusting device can be designed for controlling the temperature of the rotor unit and/or the stator unit. The thermal expansion of the material of the rotor unit or stator unit is harnessed for adjusting the preload. For an especially precise and efficient adjustment, multiple temperature zones are expediently realized which extend axially and preferably connect to one another. Different temperatures can be set in the various temperature zones. Furthermore, the adjusting device can be designed for both heating and cooling, thereby allowing systematic adjustment of preload depending on the particular requirement profile. It is also provided in particular that temperature control is provided both for the stator and rotor unit, the two parts being temperature controlled differently, i.e. one part being heated and the other cooled, for example. The temperature control corrects in particular different thermal expansions of the two bearing elements resulting from uneven heating, for example when the installation is started up. In normal, stationary operation, if i.e. the individual bearing units are typically at the same or similar temperature level, bearing preload is adjusted via temperature control according to requirements.

Within the temperature zones of a bearing element, temperature control proceeds preferably in the opposite order, such that, for example, the peripheral areas are heated and the middle area is cooled. If the outer bearing rings are connected to the bearing unit, then this results overall in an increase in both radial and axial preload, since the distance between the two outer bearing rings spaced axially is shortened, while the radius of the inner bearing unit is simultaneously enlarged through the heating of the peripheral zones, thereby also increasing radial preload. In general the temperature control serves to adjust both radial and axial preload.

For temperature control, existing cooling or heating sources of the installation can be employed. Cooling can be provided by an existing cooling system, for example one used for generator cooling. Heating can be with the aid of waste heat from the operation, for example waste heat from the generator. According to a first embodiment variant, air directed over the particular part is used as cooling medium. Also or alternatively, a liquid can be used as coolant, the liquid, for example, emitting heat via heat exchangers or cold to the particular bearing unit. The difference in temperature resulting from the cooling or heating typically ranges between 5 and 10° C.

According to an embodiment, only heating is provided for temperature control, particularly by harnessing already existing waste heat. In this way no additional energy is required for temperature control. Alternatively, only cooling can be provided. If quick heating is required, an alternative variant features an electrical heating device. This allows rapid, short-term heating, for example during a start-up procedure or for other short-term settings.

In another embodiment, a threading is realized on the stator or rotor unit and the clamping ring can be realized as a type of shaft nut and screwed onto this threading. To adjust preload, it is necessary to only turn the clamping ring against the stator or rotor unit, resulting in an axial offset, which thereby changes axial preload.

According to another embodiment, an adjustable conical bond can be arranged which features a first conical element as well as a second conical element displaceable in relation to one another, wherein one of the conical elements is tensioned against the bearing clamping ring. In this arrangement the two conical elements are usually displaceable relative to one another via an adjustment element, such as bolts for example. The first conical element can be formed by the clamping ring, and the second conical element can be formed directly by the stator or rotor unit. Each of the conical elements feature conical surfaces on which they rest against one another.

Further, in another embodiment, a rotatable taper ring with wedge surfaces sloping upward in circumferential direction can be arranged as distance element between the bearing clamping ring and the clamping ring, the wedge surfaces interacting with corresponding wedge surfaces on the clamping ring. Rotating the taper ring causes the corresponding wedge surfaces to rest against one another such that the distance between clamping ring and bearing clamping ring is varied.

The different adjusting devices for adjusting bearing preload described herein are used alternatively or partly also in combination with the bearing unit described in PCT/EP2013/000245. However, they are not limited to a specific bearing arrangement of this type, but rather can be used in principle for all large-scale bearing arrangements, in particular in motors or generators subjected to high bearing forces. Large-scale installations are to be understood in particular as motors or generators having an electrical power of several 100 kW and in particular power in the MW range. Motors or generators of this type are used in, for example, the maritime industry as ship engines or generators for container ships or large passenger ships. In assembled state, the stator unit is generally attached to a stationary part and the rotor unit to a rotating part of the large-scale installation.

According to an embodiment of the invention, the problem can also be solved by a method for adjusting the preload of a bearing arrangement. In a first exemplary embodiment, static adjustment of a bearing preload can be undertaken with the aid, for example, of interchangeable distance elements of various widths. Static adjustment provides serves, in particular, to provide precise adjustment of the desired preload following initial assembly as well as following a start-up phase after the particular tolerances have been met or after a certain operating period to compensate for the occurrence of wear. Through this static adjustment, manufacturing tolerances are compensated or various site factors such as typical wind conditions or also the repercussion of additional equipment components such as turbine configurations etc. are taken into consideration. Static adjustment can be performed during idle operation.

In contrast, dynamic adjustment can be undertaken in a second exemplary embodiment, wherein a preload can be changed depending on the particular currently prevailing operating conditions such as current wind conditions. Forecasts can also be factored into this process, i.e. expected future operating conditions.

In any case, however, it is possible to vary the preload following initial assembly. Particularly during dynamic adjustment, adjustment is performed with the aid of a control circuit depending on current measurement data. For this purpose, an appropriate sensor system is arranged which, for example, ascertains in addition to the environmental conditions the loads from installation operation overall and adjusts or corrects preload. Overall, the adjustability results in a longer service life, lower coefficients of friction and in lower loading, thereby increasing the overall total efficiency of the installation. Furthermore, optimized adaptation of preload also facilitates an adapted design for lower loads and thus a downsizing in a certain sense, thereby leading to reductions in weight and costs. Adapting the preload to current operating conditions leads to increased installation operating reliability. Sudden strain or excessive loads resulting from gusts, installation malfunctions as well as pitch errors and electrical grid and generator errors can be compensated at least partly with dynamic regulation and contribute to protecting individual components from excessive strain in the drive train. For this purpose, the dynamic adjusting device is involved in controlling the installation such that the adjusting device and the bearing arrangement overall act as an active control element in the drive train. Critical resonance frequencies in the drive train are preferably prevented through active regulation of bearing preload, thereby protecting additional components such as gearing and generator from destruction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
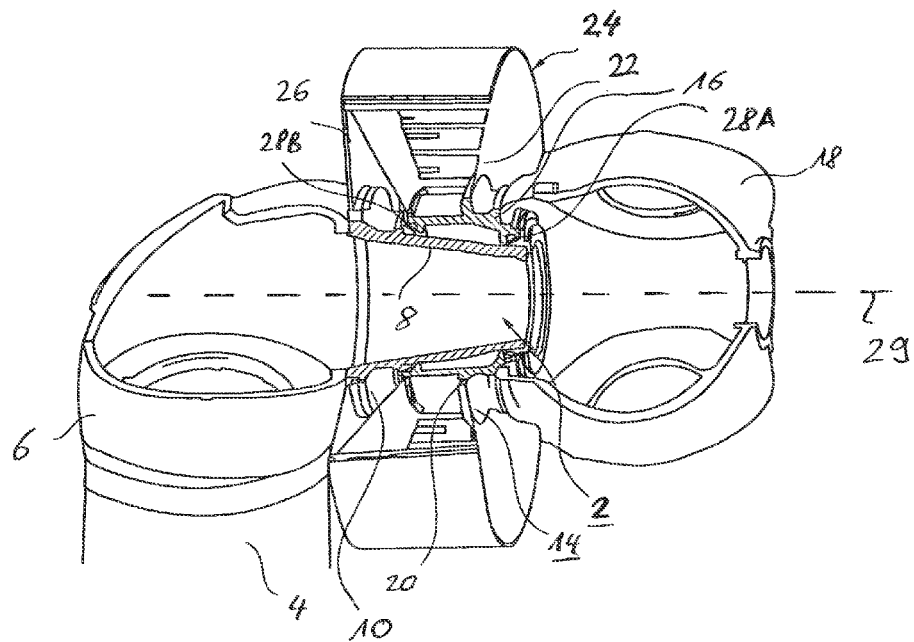
FIG. 1 is a sketch of a detail of a wind turbine having a bearing arrangement and a directly driven generator.
Figure 2:
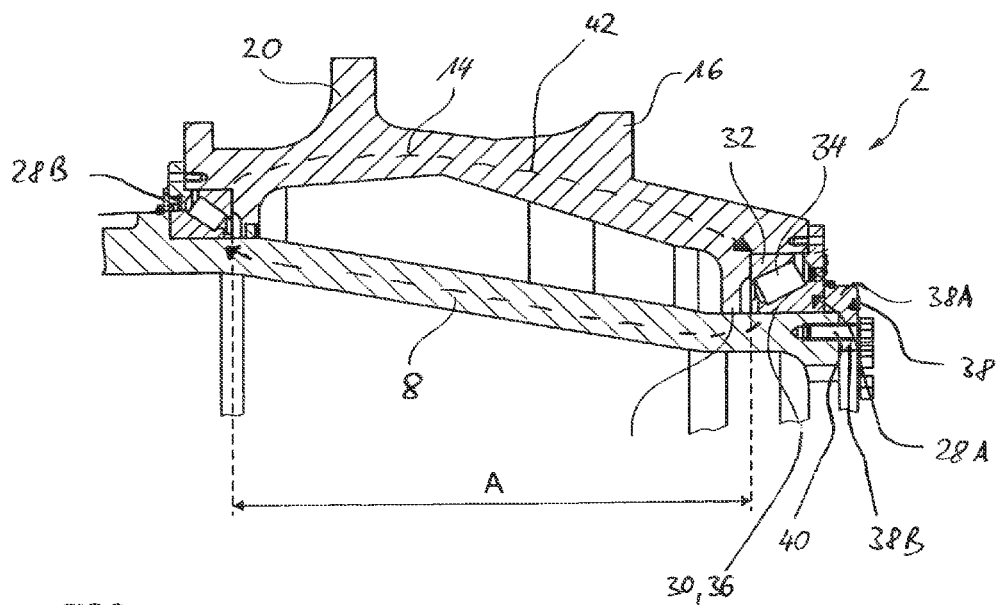
FIG. 2 is a simplified cross section of a bearing arrangement.

FIG. 1 shows a cutout of a wind turbine with a bearing arrangement 2 as illustrated enlarged and in greater detail in FIG. 2. In the wind turbine a rotatable gondola constituting a machine carrier 6 is fastened to an upper front end of a tower 4. Attached this gondola via a stator flange 10 is the bearing arrangement 2 with a stator unit 8. This flange is a ring flange running circumferentially around a front end side. Mounted circumferentially around the stator unit 8 is a rotor unit 14 to which a rotor hub 18 is fastened via a rotor flange 16 opposite the tower 4. Rotor blades (not further illustrated) are attached to this hub. Realized on the circumference side of the rotor unit 14 and between the two flanges 10, 16 is a generator flange 20 via which a rotor 22 of a generator 24 is fastened. In addition, a stator 26 of the generator 24 is fastened via the stator flange 10. The rotor unit 14 is mounted on the stator unit 8 via two bearings, specifically a rotor-side bearing 28A as well as a tower-side bearing 28B. The two bearing 28A, 28B are spaced from one another along a rotational axis 29 which defines at the same time a longitudinal or axial direction. A distance A between the two bearings 28A, 28B amounts to usually at least 0.35 times a maximal bearing diameter. In the case of the somewhat conical design of the stator unit 8 acting as bearing pin, this is defined by the outer diameter of the tower-side bearing 28B. This diameter typically ranges from 2 to 3.5 m, and the total bearing arrangement (i.e. the bearing unit without flanged components) typically has a diameter ranging from 2.5 to 4 m, while measuring a total length of 2 to 3.5 m between the two opposite lying front ends. The distance A thus lies between 0.7 and 1.2 m, depending on size.

As the enlarged view presented in FIG. 2 in particular shows, the two bearings 28A, 28B in the exemplary embodiment are realized as tapered roller bearings in O-formation. In principle other bearing designs, such as an X-formation in particular, are also possible. The bearings 28A, 28B each feature an inner ring 30, an outer ring as well as rolling bodies 34 arranged therebetween. While the tower-side bearing 28B is clamped between fixed bearing seats realized on the stator 8 or rotor unit 14, the rotor-side bearing 28A features only a fixed bearing seat in the exemplary embodiment for the outer ring 32 on the rotor unit 14. The inner ring 30 is, in contrast, displaceably arranged and functions as a bearing clamping ring 36. The bearing clamping ring 36 is held in place with the aid of a clamping ring 38 and tensioned against the outer ring 32. The clamping ring is fastened to the stator unit 8 on the front end side by means of fastening bolts 40.

A preload-circuit 42 illustrated in FIG. 2 by dashed lines is formed via the bearings 28A, 28B, via the stator unit 8 as well as via the rotor unit 14. The preload applied via the clamping ring 38 is thus transferred via this preload-circuit 42 to the entire bearing arrangement, such that the entire bearing is preloaded in an especially simple manner. The bearing arrangement 2 is preferably realized as a prefabricated construction unit which is preassembled in the state illustrated in FIG. 2 and is then brought to the construction site, for example, or preassembled at the construction site in a simple manner.

For adjusting bearing preload to a desired defined value or for likewise correcting, an adjusting device is realized which is explained in greater detail below on the basis of different embodiment variants illustrated in FIG. 3 through 14. The clamping ring 38 is an adjusting device part that is present in all embodiment variants. A common feature among all embodiment variants is that the bearing preload, starting from a base preload for which the bearing arrangement 2 is structurally designed, can be changed by having the bearing clamping ring 36 displaced in its relative position to the stator unit 8 and correspondingly also simultaneously in relation to the rotor unit 14. In several embodiment variants, the distance between the clamping ring 38 and the bearing clamping ring 36 is changed by introducing a clamping element that is effective between these two parts. In most exemplary embodiments the basic or base setting (base preload) is determined by the position of the clamping ring 38, which is secured frontally to the stator unit 8 using the fastening bolts 40 such that it remains in fixed position in relation thereto.

The clamping ring is usually formed of two ring parts, specifically an outer ring part 38A as well as by a retaining part 38B. Clamping force is transferred to the bearing clamping ring 36 via the clamping ring part 38A.

Figure 3A:
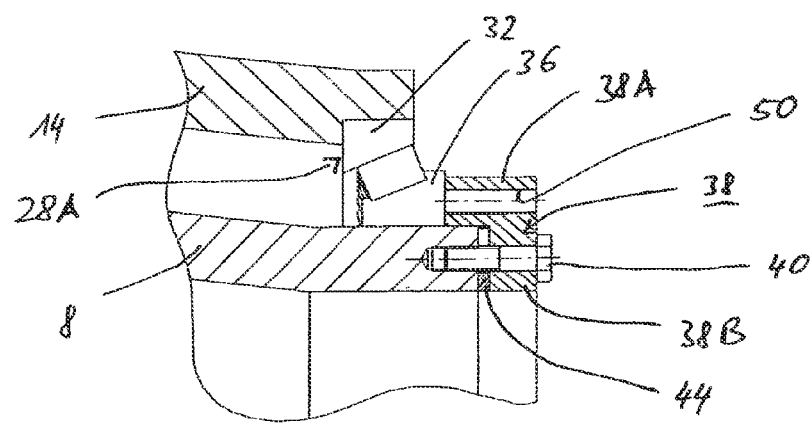
FIG. 3A is a cross section of a detail of a bearing arrangement having an adjusting device for adjusting preload by means of an interchangeable distance ring according to an embodiment.
Figure 3B:
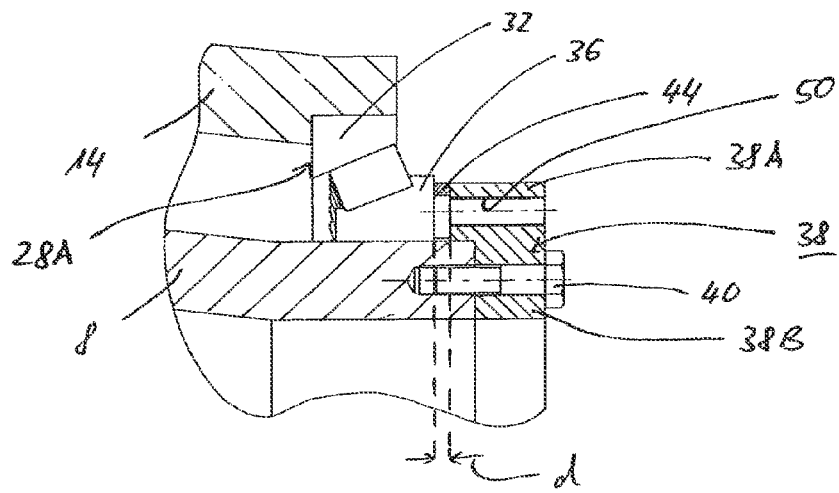
FIG. 3B is an alternative embodiment of FIG. 3A.
Figure 3C:
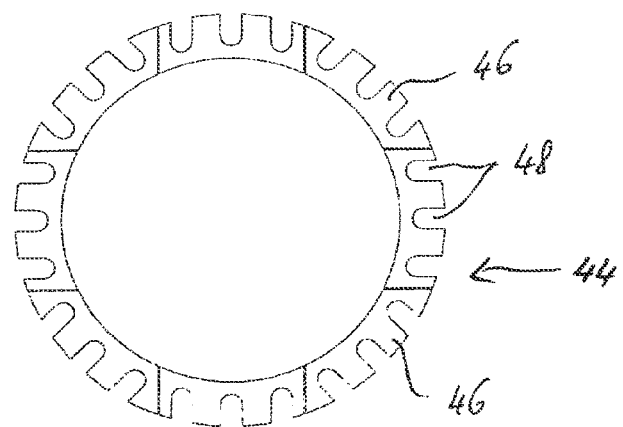
FIG. 3C is a top view of a distance ring used in FIGS. 3A and 3B.

In the embodiment variants shown in FIG. 3A and FIG. 3B a distance ring 44 is arranged for adjusting bearing preload which, in the embodiment variant shown in FIG. 3A is clamped between the retaining ring part 38B and the stator unit 8. In the embodiment variant according to FIG. 3B, the distance ring is, in contrast, placed between the clamping ring part 38A and the bearing clamping ring 36. The distance ring 44 itself is shown in greater detail in FIG. 3C. It is divided into multiple ring segments 46 and features recesses 48 which are u-shaped such that they are open on a radial side or, in the case of the embodiment variant in FIG. 3C, on the outside. Bearing preload is adjusted according to the thickness d of the distance ring 44. Various distance rings 44 of differing thicknesses d are therefore retained and used in the bearing arrangement 2 as needed. The distance ring 44 is replaced with the bearings 28A, 28B installed. The clamping ring 40 remains mounted on the stator unit 8 and does not need to be removed. This facilitates a simple as well as subsequent adjustment of preload following initial assembly, for example during maintenance work following initial operation or when switching from summer to winter operation or to compensate for wear appearing during the course of operation or, if necessary, to adjust to new load situations.

The distance ring 44 is replaced particularly in segments, i.e. the individual ring segments 46 are successively removed and replaced by a new ring segment before the next ring segment is removed, etc., so that the bearing clamping ring 36 is supported by the distance ring 44 over at least a large portion of its circumference at all times. In the embodiment variant according to FIG. 3A the fastening elements 40 are first loosened slightly such that the existing pressure is cancelled and the individual ring segments 46 can be successively removed.

In the embodiment variant according to FIG. 3B the fastening bolts 40 are not loosened. To cancel the pressure, a threaded hole 50 is made in the clamping ring part 38A into which an ejector bolt (not illustrated in greater detail here) is threaded for assembly purposes. With the aid of this bolt, the bearing clamping ring 36 is pressed away from the clamping ring 38, allowing the individual ring segments 46 to be removed.

Figure 4:
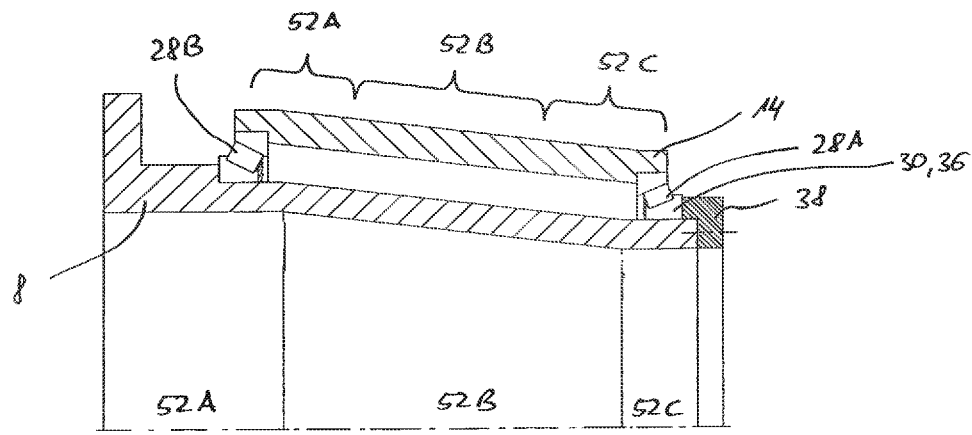
FIG. 4 is a cross section of a detail of the bearing arrangement to illustrate an embodiment featuring temperature control of the bearing units.

In the embodiment variants according to FIG. 4, a temperature control of both the rotor unit 14 and the stator unit 8 is provided for adjusting bearing preload. The different temperature zones 52A through 52C are each realized on the rotor unit 14 and stator unit 8. Specifically a tower-side zone 52A, an intermediate zone 52B and a rotor-side temperature control zone 52C are realized. The stator unit 8 and rotor unit 14 in general are systematically temperature-controlled via these temperature control zones 52A through 52C, i.e. either heated or cooled. The temperature control device is designed overall for both cooling and heating. Alternatively, it is preferably designed only for heating by harnessing waste heat. In principle, it would also be possible to have only cooling using an existing cooling system. The different temperature zones 52A through 52C can thus be temperature-controlled differently. The same is also true for stator unit 8 and rotor unit 14. The intermediate zone B extends between the two bearings 28A, 28B. In the embodiment variant according to FIG. 4, cooling the intermediate zone 52B of the stator unit 8 allows the axial bearing preload to be increased for example. This can be simultaneously supported by heating the intermediate zone 52B of the rotor unit 14. At the same time, the end zones 52A, C can each be temperature-controlled independently of the intermediate zone 52B. For example, the zones 52A, 52C of the stator unit 8 are heated, resulting in a radial preload being exerted on the bearings 28A, 28B.

Figure 5:
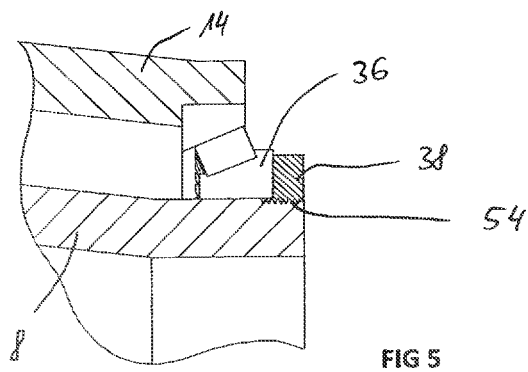
FIG. 5 is a cross section of a detail for illustrating an embodiment featuring a clamping ring realized as a shaft nut.
Figure 6:
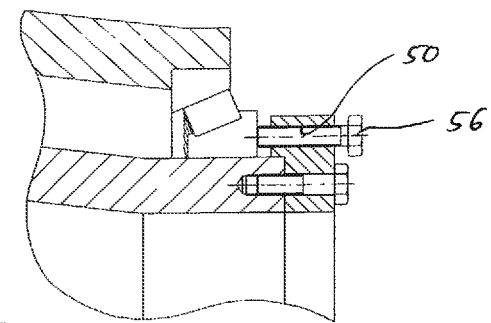
FIG. 6 is a cross section of a detail of an embodiment featuring clamping screws as clamping elements for adjusting preload.
Figure 7:
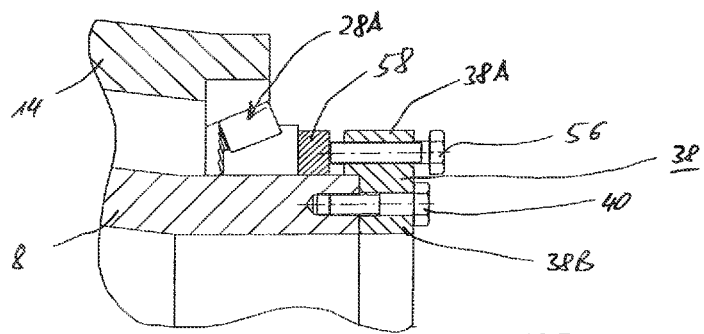
FIG. 7 is a cross section of a detail of an embodiment in which an additional intermediate element is inserted between clamping screw and bearing clamping ring.

In the embodiment variants according to FIG. 5 the clamping ring 38 is realized as a shaft nut with an inner thread which is screwed onto a thread 54 present on the frontal end of the stator unit 8. Turning the clamping ring 38 displaces the axial position thereof and thus the axial position of the bearing clamping ring 36. For actuating the clamping ring 38, actuating devices (not illustrated in greater detail here) such as a lever device or also a controllable, for example electric motor, drive are preferably provided. These readily facilitate dynamic adjustment even during running operation. Dynamic adjustment is also enabled for the embodiment variant according to FIG. 4.

In the embodiment variants according to FIG. 6 through 12, the clamping ring 38 is again similar to that of the embodiment variants according to FIGS. 3A and 3B. Instead of a distance ring 44, FIG. 6 features a clamping screw 56 being screwed into the drill hole 50 and pressing directly (FIG. 6) or indirectly using an intermediate ring 58 (FIG. 7) against the bearing clamping ring 36.

Figure 8:
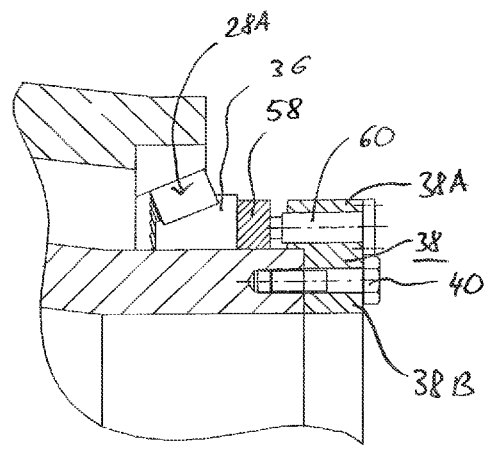
FIG. 8 is a detail of an embodiment in which preloading is undertaken with the aid of a hydraulic cylinder.

In the embodiment variant according to FIG. 8, a hydraulic cylinder 60 is arranged as clamping element instead of the clamping screw 56 and exerts a clamping force on the bearing clamping ring 36 via a hydraulic stamp, in the exemplary embodiment likewise using an intermediate ring 58.

Figure 9:
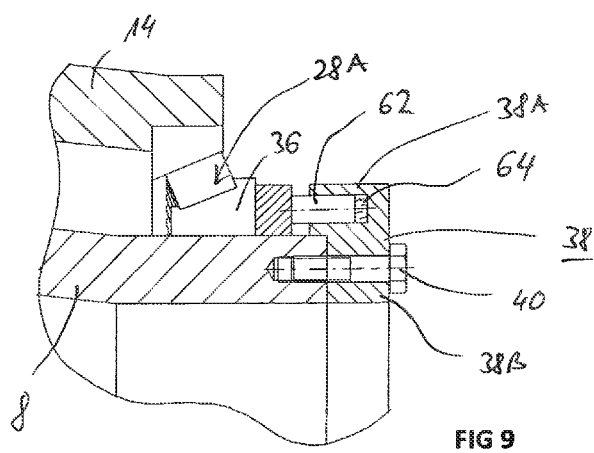
FIG. 9 is a detail of an embodiment in which adjustment is undertaken with the aid of a hydraulic piston integrated in the clamping ring.

In the embodiment variant according to FIG. 9 an alternative hydraulic adjustment variant is additionally shown in which a hydraulic stamp or piston is slidably mounted directly in the clamping ring part 38A, wherein at the base of a blind hole in which the hydraulic piston is mounted, a fluid reservoir 64 for a hydraulic fluid is realized. This is fluidically connected to a hydraulic supply in a manner not further illustrated such that the hydraulic piston 62 can be displaced by the pressure of the hydraulic fluid to exert a desired preload on the bearing clamping ring 36.

Figure 10:
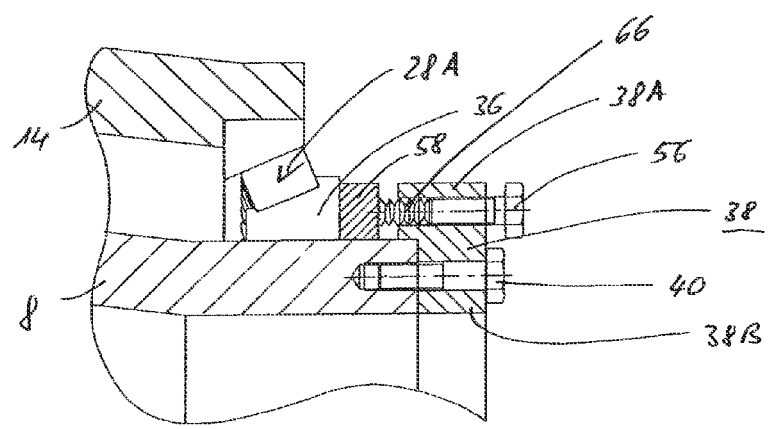
FIG. 10 is a cross section of a detail of an embodiment in which adjustment is undertaken with the aid of a spring element.

In the embodiment variant according to FIG. 10 a spring element 66 is arranged for adjusting preload, the spring element being clamped between the clamping screw 56 and an intermediate ring 58. Adjusting the clamping screw 56 changes the spring preload and thereby the bearing preload.

Figure 11:
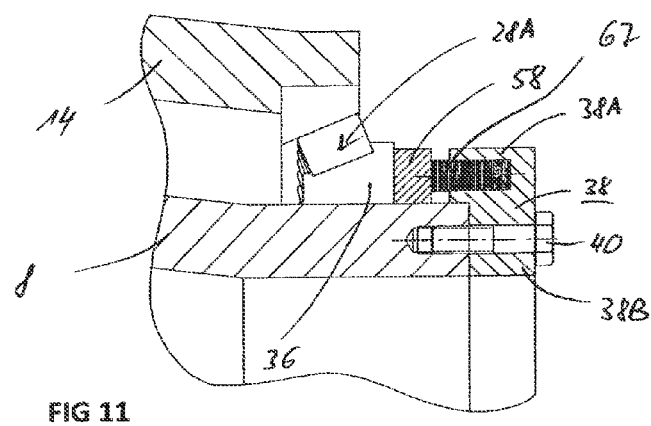
FIG. 11 is a cross section of a detail of an embodiment in which adjustment is undertaken with the aid of a piezo element.

In the embodiment variant according to FIG. 11 a piezo element 67, in particular a piezo stack having a plurality of individual piezo elements, is employed as clamping element, which is in turn effective between the clamping ring part 38A and the bearing clamping ring 36 through the intermediate ring 58.

Figure 12:
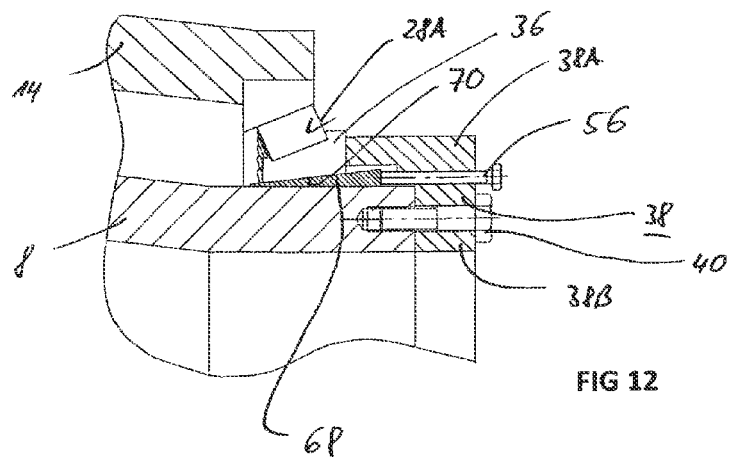
FIG. 12 is a cross section of a detail of an embodiment in which adjustment is undertaken with the aid of a clamping wedge.

Similar as in the exemplary embodiment according to FIG. 10, the exemplary embodiment according to FIG. 12 features a two-part clamping element design, wherein in addition to the clamping screw 56 an additional clamping element in the form of a clamping wedge 68 is arranged in the exemplary embodiment according to FIG. 12. This is arranged displaceably in longitudinal direction between the circumferential side of the stator unit 8 and the bearing clamping ring 36. On its inner ring surface it features a wedge surface 70 corresponding to the clamping wedge 68. The clamping wedge 68 is displaced axially by means of the clamping screw 56, thereby simultaneously increasing both axial and radial bearing preload.

Figure 13:
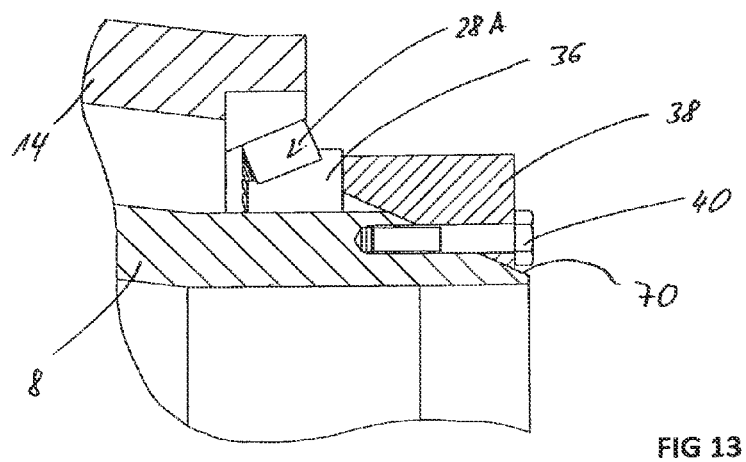
FIG. 13 is a cross section of a detail of an embodiment in which adjustment is undertaken with the aid of an adjustable conical bond.

The embodiment variant according to FIG. 13 features a modified embodiment variant of a wedge adjustment in which the clamping ring 38 and the stator unit 8 themselves form a wedge bond. For this purpose the stator unit 8 features a wedge surface 70 at its end and the clamping ring a corresponding wedge surface 70 on its inner ring surface. The clamping ring can be shifted along the wedge surfaces 70, specifically with the aid of the fastening bolts 40, and exerts the desired preload on the bearing clamping ring 36. To reduce the load of the bolt head a spacer sleeve is arranged between the bolt head and the clamping ring 38 in a preferred refinement.

Figure 14:
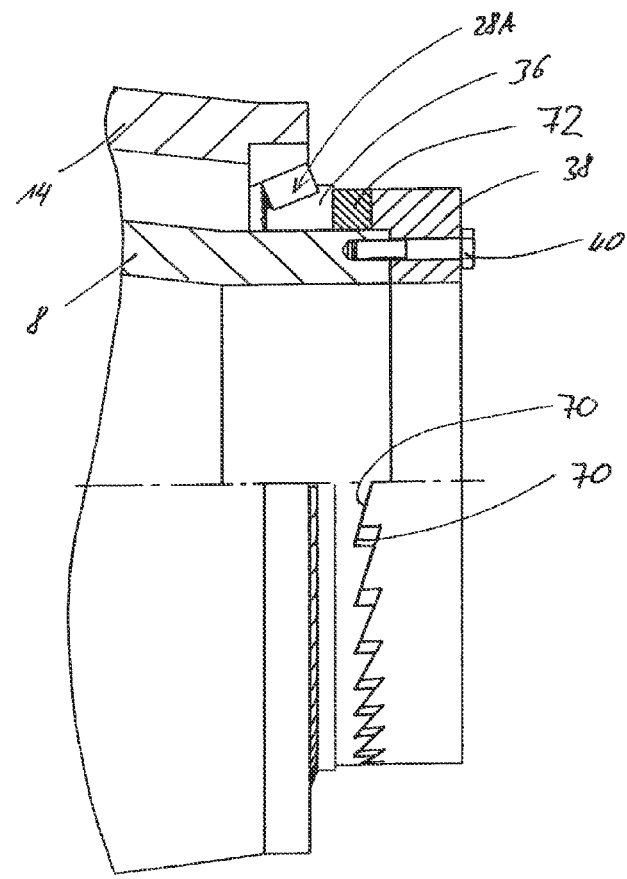
FIG. 14 is a cross section of a detail of an embodiment in which a taper ring is arranged between clamping ring and bearing clamping ring.

Finally, in the embodiment variant according to FIG. 14, a distance element is clamped between the clamping ring 38 and the bearing clamping ring 36 via which the distance between these two parts can be varied for the purpose of adjusting preload. The distance element is realized as taper ring 72 which features on the frontal surface of its peripheral side oriented toward the clamping ring 38 a plurality of sawtooth-like wedge surfaces 70. The clamping ring 38 also features a plurality of corresponding sawteeth having the same type of wedge surfaces. For adjusting preload, the taper ring 72 is rotated such that the wedge surfaces 70 corresponding to one another slide against one another, thereby increasing or decreasing the distance. The taper ring 72 is in turn rotated—similar to the embodiment variant according to FIG. 5 having the clamping ring 38 realized as shaft nut—via a manually actuated lifting mechanism or drive, preferably by a controllable (electric motor) drive.

The individual embodiments for the adjusting device were illustrated using the preferred exemplary embodiments according to FIG. 1 and FIG. 2, respectively. However, the embodiment variants can be applied in principle to different bearing arrangements and bearing types. The use thereof is thus not limited to a specific bearing arrangement according to FIG. 1. In particular, rotor and stator units 8, 14 can also be switched, i.e. the rotor unit 14 can be realized on the inside and the stator unit on the outside according to embodiment variant.

In the detailed illustrations of FIG. 2 through 14, simply only one single fastening bolt 40 or clamping screw 56 as well as additional clamping elements 58, 60, 62, 66, 67 are shown. Because of the large dimensions, a plurality of adjustment or clamping elements of this type is arranged distributed over the circumference, for example at an angular distance of 10 to 20°. The additional typically ring-shaped adjustment elements such as distance ring 44, clamping wedge 68 or also taper ring 72 are in contrast preferably circumferential ring-shaped elements. However, these can also be composed of individual parts. In particular, the clamping wedges 68 can be assigned as individual parts to a particular clamping screw 56. However, the clamping wedge 68 is realized as a circumferential clamping wedge ring.

The embodiment variants according to FIGS. 4, 5, 8, 9, 11 and 14 can be adjusted even during operation in a simple manner via appropriate control elements. In particular these variants are adjusted and corrected, for example, for dynamic setting of bearing preload depending on current operating conditions. For this purpose an appropriate control and regulating unit is realized which is preferably integrated into the normal control of the wind turbine. For regulation, multiple measurement value sensors are arranged which measure, for example current wind strength, current bearing loading values and correct bearing preload on the basis of these measured values using an adjusting device. In addition, it is also possible to adapt bearing preload in advance in anticipation of changing load conditions.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A wind turbine bearing arrangement that is a main bearing for a rotor hub of a wind turbine, the arrangement comprising:
a stator unit;
a rotor unit, the stator unit and rotor unit are mounted on one another via a rotor-side bearing and a tower-side bearing, the rotor side bearing and the tower-side bearing being arranged spaced apart from one another by a distance of at least 0.35 times a maximal bearing diameter that ranges from 2 m to 3.5 m and each having an inner bearing ring and an outer bearing ring, wherein the tower-side bearing is clamped between fixed bearing seats on the stator unit and the rotor unit and wherein the rotor-side bearing is clamped between a clamping ring and only one fixed bearing seat on either the stator unit or the rotor unit, such that a preload-circuit is formed by the rotor-side and tower-side bearings and by the stator unit, wherein a base preload is set during assembly via the preload-circuit, wherein the inner bearing ring or the outer bearing ring is a bearing clamping ring and wherein the rotor-side bearing is smaller than the tower-side bearing; and
a mechanical adjusting device having the clamping ring via which a preload on the bearing clamping ring is changeable relative to the base preload such that a preload of the rotor-side bearing and tower-side bearings are adjustable via the preload-circuit, wherein the mechanical adjusting device is arranged such that the preload is variable relative to the base preload following initial assembly in a static or dynamic manner.

2. The wind turbine bearing arrangement as claimed in claim 1, wherein the clamping ring has two ring parts, the two ring parts being a retaining ring part and a clamping ring part, the retaining ring part being clamped against the stator unit or the rotor unit by a fastening element and the clamping ring part overlapping with the bearing clamping ring for transferring the preload.

3. The wind turbine bearing arrangement as claimed in claim 2, wherein threaded holes for clamping or ejector bolts are provided in the clamping ring part.

4. The wind turbine bearing arrangement as claimed in claim 2, wherein, arranged on the clamping ring part are clamping elements via which the preload is transferred to the bearing clamping ring, and wherein the clamping elements comprise clamping screws, hydraulic cylinders, hydraulic pistons integrated in the clamping ring part, adjustable spring elements, piezo elements or at least one clamping wedge.

5. The wind turbine bearing arrangement as claimed in claim 2, wherein clamping screws are guided through the clamping ring part and act on a further clamping element.

6. The wind turbine bearing arrangement as claimed in claim 1, wherein a distance element that is interchangeable when the bearings are installed is arranged between the clamping ring and the bearing clamping ring, and wherein the preload is adjustable by a thickness of the distance element.

7. The wind turbine bearing arrangement as claimed in claim 6, wherein the distance element is a distance ring and is divided into several segments that are removable in a radial direction.

8. The wind turbine bearing arrangement as claimed in claim 7, wherein the segments have open recesses on one side through which fastening elements are guided such that the segments are removed when the fastening elements are installed.

9. The wind turbine bearing arrangement as claimed in claim 6, wherein the distance element is arranged between the clamping ring part and the bearing clamping ring.

10. The wind turbine bearing arrangement as claimed in claim 1, wherein a thread is provided on the stator unit or the rotor unit, and wherein the clamping ring is screwed onto the thread and is twistable relative to the bearing clamping ring to adjust the preload.

11. The wind turbine bearing arrangement as claimed in claim 1, wherein the clamping ring is a first conical element and the stator unit or the rotor unit is a second conical element, wherein an adjustable conical bond is arranged with the first conical element, and the second conical element, and wherein the first conical element is displaceable in relation to the bearing clamping ring.

12. The wind turbine bearing arrangement as claimed in claim 1, wherein, arranged between the clamping ring and the bearing clamping ring is a rotatable taper ring having wedge surfaces rising circumferentially that interact with corresponding wedge surfaces on the clamping ring such that rotating the taper ring varies a distance between the clamping ring and the bearing clamping ring.

13. A method for adjusting a preload of the wind turbine bearing arrangement as claimed in claim 1, wherein the adjusting device is arranged such that the preload is varied relative to the base preload as needed.

14. The method as claimed in claim 13, wherein the preload is varied following initial assembly, wherein the preload is changed during operation, wherein the preload is adjusted according to a changed loading situation when operating conditions have changed, and/or wherein the preload is dynamically adjusted depending on current measured variables or environmental measured variables such as wind measurements or wind forecasts.

15. The method as claimed in claim 13, wherein the adjustment is performed dynamically during an operation of the wind turbine via a control circuit.

16. A wind turbine bearing arrangement that is a main bearing for a rotor of a wind turbine, the arrangement comprising:
a stator unit;
a rotor unit, the stator unit and rotor unit are mounted on one another via a rotor-side bearing and a tower-side bearing, the rotor side bearing and the tower, side bearing being arranged spaced apart from one another and each having an inner bearing ring and an outer bearing ring, wherein a preload-circuit is formed by the rotor-side and tower-side bearings and by the stator unit, wherein a base preload is set during assembly via the preload-circuit, and wherein the inner bearing ring or the outer hearing ring is a bearing clamping ring; and
an adjusting device having a clamping ring via which a preload on, the bearing clamping ring is changeable relative to the base preload such that a preload of the rotor-side bearing and tower-side bearings are adjustable via the preload-circuit,
wherein the adjusting device controls a temperature of the rotor unit and/or the stator unit, and
wherein multiple temperature zones are realized in an axial direction.

17. The wind turbine bearing arrangement as claimed in claim 16, wherein the adjusting device is adapted for both heating and cooling.

18. The wind turbine bearing arrangement as claimed in claim 16, wherein waste heat arising from operation and/or an existing cooling system is utilized for temperature control.

19. A wind turbine bearing arrangement that is a main bearing for a rotor of the wind turbine, the arrangement comprising:
at least one bearing for bearing a rotor unit on a stator unit, the at least one bearing having two bearing rings, which include an inner ring and an outer ring, the two bearing rings being clamped against one another with a base preload,
wherein the preload of the at least one bearing is varied relative to the base preload by an adjusting device, the adjusting device having a clamping ring comprising two ring parts, the two ring parts being a retaining ring part and a clamping ring part, the retaining ring part being clamped against the stator unit or the rotor unit by a fastening element, and
wherein one of the bearing rings is a bearing clamping ring and the clamping ring part overlapping the bearing clamping ring for transferring the preload, and
wherein threaded holes for clamping or ejector bolts are provided in the clamping ring part.

* * * * *